US012689144B2

(12) United States Patent
Oppliger

(10) Patent No.: US 12,689,144 B2
(45) Date of Patent: Jul. 21, 2026

(54) CONNECTOR ELEMENT FOR A CONNECTOR SYSTEM FOR PROVIDING RELEASABLE ELECTRICAL CONNECTION BETWEEN COMPONENTS OF A CHAIN TRANSMITTING ELECTRICAL SIGNALS

(71) Applicant: Mettler-Toledo GmbH, Greifensee (CH)

(72) Inventor: Thierry Oppliger, Greifensee (CH)

(73) Assignee: Mettler-Toledo GmbH, Greifensee (CH)

( * ) Notice: Subject to any disclaimer, the term of this patent is extended or adjusted under 35 U.S.C. 154(b) by 350 days.

(21) Appl. No.: 18/536,338

(22) Filed: Dec. 12, 2023

(65) Prior Publication Data

US 2024/0204439 A1 Jun. 20, 2024

(30) Foreign Application Priority Data

Dec. 16, 2022 (EP) .................................... 22214298

(51) Int. Cl.

| | |
|---|---|
| ***H01R 13/405*** | (2006.01) |
| ***H01R 12/70*** | (2011.01) |
| ***H01R 13/52*** | (2006.01) |
| ***H01R 43/00*** | (2006.01) |
| ***H01R 43/02*** | (2006.01) |

(52) U.S. Cl.

CPC ......... *H01R 13/405* (2013.01); *H01R 12/707* (2013.01); *H01R 13/5202* (2013.01); *H01R 13/5205* (2013.01); *H01R 43/005* (2013.01); *H01R 43/0256* (2013.01)

(58) Field of Classification Search

CPC ................ H01R 13/405; H01R 12/707; H01R 13/5202; H01R 13/5205; H01R 43/005; H01R 43/0256; H01R 13/64; H01R 13/6585; H01R 24/86; H01R 13/02; H01R 13/502; H01R 13/629; H01R 13/639; H01R 13/642

See application file for complete search history.

(56) References Cited

U.S. PATENT DOCUMENTS 7,736,159 B1 * 6/2010 Effinger, III ........... H01R 24/86 439/607.05
9,306,333 B2 * 4/2016 Dang ................. H01R 13/6461
9,430,881 B2 8/2016 Reynolds, IV et al.

(Continued)

*Primary Examiner* — Edwin A. Leon

(74) *Attorney, Agent, or Firm* — Standley Law Group LLP; Jeffrey S. Standley; Adam J. Smith

(57) ABSTRACT

A connector element for a connector system includes four contact members for making electric contact on a front side of the connector element, and a contact member carrier. The contact members extend in an axial direction on a circumferentially extending contact surface of the contact member carrier. The contact members have a free contact surface which is accessible on the circumferentially extending contact surface of the contact member carrier. Each contact member has an insulation radius, when measured in a view onto the front face, is a minimum clearance between outer boundaries of said the contact member and a closest neighboring contact member. The contact members are grouped into two groups of contact members where a closest neighboring contact member to a respective contact member belongs to the other group of contact members than the respective contact member.

17 Claims, 5 Drawing Sheets

(56) References Cited

U.S. PATENT DOCUMENTS

| | | | | |
|---|---|---|---|---|
| 10,992,076 | B2* | 4/2021 | Tanaka | H01R 13/506 |
| 11,011,871 | B2* | 5/2021 | Fujiwara | H01R 13/631 |
| 11,415,550 | B2 | 8/2022 | Both et al. | |
| 12,057,661 | B2* | 8/2024 | Johannes | H01R 24/86 |
| 2004/0224552 | A1* | 11/2004 | Hagmann | H01R 13/65917 439/461 |
| 2020/0274278 | A1* | 8/2020 | Kameyama | H01R 13/6585 |
| 2021/0013660 | A1* | 1/2021 | Markefka | H01R 13/42 |
| 2021/0281022 | A1 | 9/2021 | Moncher et al. | |
| 2022/0278489 | A1* | 9/2022 | Cording | H01R 13/629 |
| 2023/0139373 | A1* | 5/2023 | Dietz | H01R 13/6205 340/468 |

* cited by examiner

CONNECTOR ELEMENT FOR A CONNECTOR SYSTEM FOR PROVIDING RELEASABLE ELECTRICAL CONNECTION BETWEEN COMPONENTS OF A CHAIN TRANSMITTING ELECTRICAL SIGNALS

CROSS-REFERENCE TO RELATED APPLICATIONS

This application claims the benefit of European Patent Application No. EP 22214298.6 filed Dec. 16, 2022, the disclosures of which are hereby incorporated by reference as if fully restated herein.

TECHNICAL FIELD

Exemplary embodiments relate generally to a connector element for a connector system, such as for electronic signalling, and related systems and methods.

BACKGROUND AND SUMMARY OF THE INVENTION

In numerous technical applications it is found desirable to replace individual elements in a chain transmitting signals, for instance originating from a sensor. It may thus be found desirable that a releasable connection is provided between individual elements of such a chain, for one specific instance at the connection between an analog-digital converter and a signal cable for transmitting the digitized signals from the analog-digital converter to a data collection and/or data processing device. For instance, a plug-and-socket connector system may be implemented. In an aspect, it may be desirable if releasing and re-establishing the connection between components can be performed directly by the user, or by a service technician in the field while avoiding the risk of re-establishing the connection with wrongly connected contacts, or lines, respectively. In another aspect, signal transmission shall not be impaired by dirt in the releasable interface or creeping currents on the surfaces of the connector elements of the releasable interface, or connection system. In this respect, it may also be found desirable to achieve good sealing of the connection system, such that no dirt, liquid or humidity can penetrate between the connector members. In still a further aspect, the size of the connector members may be limited.

It is understood that the desire for connector elements and connector systems yielding characteristics mentioned above may be present in other technical fields.

Known art comprises the product offered on the priority date of the present application by Büschel Connecting Systems, Albstadt, Germany, under the name "Variopin".

It is an object of the present disclosure to provide the initially mentioned subject matter. In a more specific aspect, a connector element for connector system shall be provided. In particular instances the connector element and connector system shall be adapted and configured for transmitting electric power and signals. In more specific aspect, said connector element shall yield certain desirable characteristics outlined above.

This is achieved by the subject matter set forth in claim 1.

Further effects and advantages of the disclosed subject matter, whether explicitly mentioned or not, will become apparent in view of the disclosure provided below.

Accordingly, disclosed is a connector element for a connector system comprising four contact members for making electric contact. Preferably, the connector element comprises exactly four contact members. As will be readily appreciated, electric contact is to be made with a counterpart contact member of a counterpart connector element. The contact members are accessible from a front side of the connector element. The connector element further comprises a contact member carrier, wherein the contact member carrier comprises a circumferentially extending contact surface having an axial extent. The contact members extend in an axial direction on the circumferentially extending contact surface of the contact member carrier. On the circumferentially extending contact surface of the contact member carrier the contact members have free contact surfaces which are accessible on the circumferentially extending contact surface of the contact member carrier. Each contact member has an insulation radius. The insulation radius is a minimum clearance between the outer boundaries of said contact member and the closest neighbouring contact member. This minimum clearance is measured in a plan view onto the front face. The contact members are grouped into two groups of contact members. Each contact member has a closest neighbouring contact member which defines its insulation radius. This closest neighbouring contact member and the contact member at hand belong to different groups of contact members.

This shall be understood as implicitly meaning that the insulation distance from a contact member to the other contact member in the same group of contact members is larger than the insulation distance to a contact member of the other group of contact members. The insulation distance between two contact members is measured as a minimum clearance between the outer boundaries of two contact members. In still other words, the contact members are arranged non-equidistant. The non-equidistance applies to measurements taken in the plan view onto the front face and in particular applies when measuring the distance between the contact members along the circumference of the circumferentially extending contact surface of the contact member carrier.

It is understood that, as a consequence of above definitions, groups of contact members comprise contact members which each have at least one other contact member not belonging to the group of contact members closer to them than the other contact member out of the group of contact members.

Preferably, there is therefore for every one of the contact members belonging to a first group, at least one contact member of the second group to which the minimum clearance is smaller than to the one to any one of the other contact members of the first group and vice versa.

The insulation resistance between the contact members in one group of contact members is larger than the insulation resistance between a contact member out of one group of contact members and a contact member out of the other group of contact members. In particular, the resistance for creeping currents between two contact members in one group of contact members on the front face of the contact member carrier is increased when compared to a connector element having the same size with the contact members arranged equidistantly.

Preferably, the groups are pairs.

Preferably, instead of an insulation radius the term "minimum insulation distance can be used, whereby each contact member has a minimum insulation distance when measured in a plan view onto the front face, wherein the minimum insulation distance is preferably measured as a minimum clearance between the outer boundaries of said contact member and the closest neighbouring contact member. In this embodiment, the contact members are preferably grouped into two pairs of contact members, wherein each contact member has its minimum insulation distance with a contact member of the other pair of contact members.

The contact member carrier may, in particular, be made of a plastic with a high insulation resistance. Preferably, the high insulation resistance is greater or equal to $10^{14}$ Ω/cm. This allows to obtain the desired electrical properties even at small insulation radii such as radii between 1 and 2 mm. Preferably, the plastic is injection mouldable. This facilitates the production of the connector element. Preferably, the plastic has a water absorption of less or equal to 0.4% and can be used at temperatures between −40° C. and +85° C. With these properties, the connector element can be used reliably in a surrounding where it might get wet and at all temperatures at which sensors and chains transmitting signals from these sensors are typically used. Preferably, the plastic is therefore one of the following: PBT, PEEK, PPE, PPS, LCP or a fluoroplastic such as PCTFE, PVDF, ECTFE, ETFE, PFA or FEP.

It is noted that within the framework of the present disclosure the use of the indefinite article “a” or “an” does in no way stipulate a singularity nor does it exclude the presence of a multitude of the named member or feature. It is thus to be read in the sense of “at least one” or “one or a multitude of”.

It is moreover noted that in the context of the present application the terms “bordering” and “adjacent” as well as “bordering” and “adjacent to” are considered as synonyms.

The contact members may in exemplary embodiments be arranged on the corners of a tetragon, wherein the tetragon has at least two parallel sides. The parallel sides of the tetragon extend at least between the contact members of each of the groups of contact members. The corners of the tetragon may for instance be the centerpoints of the contact members or the border points of the contact members where they are closest to either a neighboring contact member in the same group of contact members or a neighboring contact member in the other group of contact members. In another aspect, common tangents of any two neighboring contact members on a side of the contact members facing the two other contact members may be considered. The thus defined four tangents may form a tetragon with at least two parallel sides, wherein at least the tangents of the two groups of contact members having the greater distance to each other are parallel. In particular, said tetragon may be a rectangle, which has one group of shorter sides and one group of longer sides.

In a preferred embodiment, the smaller distance between the at least two parallel sides is between 1 mm and 1.2 mm, more preferably between 1.05 mm and 1.1 mm. In another preferred embodiment, the smaller distance between the at least two parallel sides is between 1.6 mm and 1.95 mm, more preferably 1.65 mm and 1.8 mm. These specific choices allow to arrange a printed circuit board (PCB) between projecting sections of the contact members. As will be explained in the following, using projecting sections of the contact members to support the PCB facilitates connecting a PCB to the connector element and makes the connection more robust.

In further exemplary embodiments, the contact members extend axially through the contact member carrier and project on the back side of the contact member carrier with projecting sections of the contact members. The projecting sections of each pair of contact members have common tangents, wherein the common tangent of the projecting sections of the first group of contact members on a side facing the projecting sections of the second group of contact members is parallel to the common tangent of the projecting sections of the second group of contact members facing the projecting sections of the first group of contact members. A clear space is provided between the projecting sections of the first group of contact members and the projecting sections of the second group of contact members. In aspects, common tangents of any two neighboring projecting sections of contact members on a side of the projecting sections facing the two other projecting sections of contact members may be considered. The thus defined four tangents may form a tetragon with at least two parallel sides, wherein at least the tangents of the two groups of contact members having the greater distance to each other and/or of the two groups of projecting sections having the greater distance to each other are parallel.

A recess may be provided on the back side of the contact member carrier between the projecting sections of the first group of contact members and the projecting sections of the second group of contact members. The recess may be dimensioned to receive remains on an end of the printed circuit board. Thus, the printed circuit board can be attached flush with the back side of the contact member carrier, even if it has manufacturing tolerances.

Further, the contact member carrier may in embodiments comprise at least one of collars extending from the back side and surrounding the projecting sections of the contact members projecting from the back face along a part of their longitudinal extents, and/or recesses surrounding the projecting sections of the contact members. These features may serve to further increase the creepage distance for electrical currents and thus reduce such creeping currents between neighbouring contact members on the back side of the contact member carrier.

The contact members may, in particular, be provided as, while not limited to, rods or spring contact.

In other embodiments, the contact members extend axially through the contact member carrier and project on the back side of the contact member carrier with projecting soldering lugs. The contact members may be provided as spring contacts with a soldering lug on a back end. The spring contacts may be gold-plated to protect them from corrosion and to ensure low contact resistance. The spring contacts may be placed in a plastic receptacle shell of the contact member carrier and be kept in place by a contact holder secured to the back side of the contact member carrier and holding the spring contacts in place, while the soldering lugs extend through the contact holder and project from the back of the contact member carrier. There may be hooks on the outer diameter of the contact member carrier and adjacent the back end of the contact member carrier onto which the contact holder may be snapped. The contact member carrier and/or the contact holder may in particular be made of a plastic with a high insulation resistance. In further, more particular embodiments, a coding structure may be provided on the circumferentially extending contact surface of the contact member carrier, for instance on a peg or inside a socket. These embodiments are outlined in more detail below. Thus, the contact member carrier has a circumferential reference position. The contact member carrier and the contact holder may also comprise interacting coding structures such that the contact holder can only be attached to the contact member carrier in one orientation relative to the circumferential reference position. On the back of the contact holder the contacts extending therethrough may be marked to make correct wiring easier. It is thus facilitated to connect each wire attached to a soldering lug to a contact member having a specific circumferential position in or on the contact member carrier.

As noted above, a coding structure may be provided on the circumferentially extending contact surface of the contact member carrier. Said coding structure comprises at least one of a projection on the circumferentially extending contact surface of the contact member carrier and/or an axially extending groove in the circumferentially extending contact surface of the contact member carrier. The coding structure provides for an asymmetry of the circumferentially extending contact surface of the contact member carrier in the circumferential direction and defines a circumferential reference position of the contact member carrier.

In exemplary embodiments, the circumferentially extending contact surface of the contact member carrier is cylindrical.

In embodiments of the connector element, the contact member carrier may comprise a peg, wherein the circumferentially extending contact surface of the contact member carrier is provided on the lateral outer circumferential surface of the peg. The peg is preferably a cylindrical protrusion of the contact member carrier. It is preferably the peg of the connector element which is dimensioned and intended to be at least partially inserted in a socket comprising a complementary formed contact surface.

In other embodiments, however, the contact member carrier may comprise a socket having an axially extending wall limiting the socket and forming the circumferentially extending contact surface.

It may further be provided that the connector element, on its back side, i.e., opposite the front side, comprises at least one alignment structure configured and adapted for receiving and aligning a printed circuit board. The at least one alignment structure comprises at least one axially—in relation to the connector element—extending support notch formed in the at least one alignment structure. The at least one support notch is configured to receive a printed circuit board when the printed circuit board is advanced into the at least one support notch along the axial direction of the connector element, while the two faces of the printed circuit board extend in an axial direction of the connector element and in a radial direction of the connector element. The at least one support notch is in particular configured such that a printed circuit board received in the support notch is placed in the clear space between the projecting sections of the two groups of contact members. A first one of the at least one support notch extends radially to a greater extent than a further support notch on a radially opposite side of the connector element. In a preferred embodiment, there is no such further support notch. Thereby, the alignment structure is asymmetric in the axially extending plane between the two groups of contact members with respect to the axial direction of the connector element. In a preferred embodiment, the first one of the at least one support notch extends radially entirely through one of the at least one alignment structure while an alignment structure wall on a side of the connector element radially opposite said first one of the at least one support notch is closed on a radially outer side. The printed circuit board, when installed, is aligned and/or supported in the radial direction by the alignment structure wall. Further, it is enabled to install the printed circuit board off-centric with respect to the connector member or contact member carrier, respectively, i.e., laterally offset. This has the advantage that the pattern of circuit paths on a PCB to be mounted to the connector element and the projecting sections of the contact members can be chosen such that they only match if the PCB is arranged in a desired orientation with respect to the connector element. This facilitates the production of electronic devices and reduces errors. A further support notch in the form of a support groove may in embodiments be formed on a radial inner side of one of the at least one alignment structure and be closed on a radially outer side, wherein a connection line between the two support notches extends in an axially and radially extending plane between the two groups of contact members.

In a connector element comprising a peg, as set forth above, it may be provided that the peg extends from a cylindrical section of the connector element having a larger cross-sectional dimension than the peg. Said cylindrical section may for instance be part of the contact member carrier. The cylindrical section comprises at least one circumferential groove on its outer diameter, wherein the circumferential groove is configured to receive an O-ring therein, for sealing purposes, as outlined in more detail below.

In further embodiments of the connector element, a locking sleeve is revolvably and axially mobile, for instance between two axial end stops, received on the connector element. The locking sleeve may in particular be configured for a bayonet lock. A counterpart structure configured to interlock with the locking sleeve, in particular in a form lock relationship, is provided on the outside of an element comprising a counterpart connector element. The counterpart structure may for an instance be provided on the outside of an electronic device comprising the counterpart connector element configured for making connection with the connector element comprising the locking sleeve. Bayonet locks yield the advantage of being easier to clean than threads, and moreover locking and unlocking is facilitated when compared to a pair of threads. In addition, the Bayonet lock according to the invention avoids a rotation of the connector element and the counterpart connector element with respect to each other. This has the advantage that the elements in the chain transmitting signals which are connected with the connector element and its counterpart can remain in their respective holders while the connection is established.

In another aspect, there is disclosed an electronic device comprising a connector element and a printed circuit board, wherein the printed circuit board is received in the clear space between the projecting sections of the first group of contact members and the projecting sections of the second group of contact members, and the projecting sections of the contact members are soldered directly to conductor paths of the printed circuit board. For instance, the clear space defined between the projection sections of the two groups of contact members and measured between the facing tangents of the projection sections of the two groups of contact members may be more than or equal to one times the thickness of the printed circuit board and smaller than or equal to 1.2 times the thickness of the printed circuit board, and may in even more particular embodiments be more than or equal to 1.05 times the thickness of the printed circuit board and smaller than or equal to 1.1 times the thickness of the printed circuit board. Preferably, the PCB has a thickness of 1 mm. This allows to miniaturize the electronic device while still ensuring that the distances are sufficient to reduce creeping currents and ensuring the mechanical stability of the PCB.

A housing may be provided which encases the printed circuit board and at least a part of the connector element, wherein an O-ring sealing is provided between the connector element and the housing. Preferably, the housing is cylindrical with an outer diameter of less or equal 1.5, preferably less or equal to 1.25 times and most preferably greater or equal to 1 times, the diameter of the shaft of a sensor which forms the electronic device or to which the electronic device is intended to be mounted. Preferable, the housing is cylindrical with an outer diameter of less or equal to 18 mm, preferably less or equal to 15 mm and most preferable greater or equal to 12 mm. Sensors, such as pH-sensors, conductivity sensors, ion-selective electrodes to measure ion concentrations, sensors to determine dissolved oxygen, turbidity and/or oxidation reduction potential comprise typically a shaft with a diameter of 12 mm. A housing with an outer diameter which is equal to or slightly greater than the sensor shaft ensures that the combination of sensor shaft and electronic device is handy and convenient to store and to mount. The housing with such dimensions does not distract the view on the sensor shaft and allows the use of sensor holding devices designed for sensors without an electronic device according to the invention.

In still a further aspect, a system is provided which contains a first connector element comprising a peg, wherein the contact members are provided on the circumferentially and axially extending surface of the peg, and a second connector member comprising a socket, wherein the contact members are provided on a wall radially limiting the socket. The peg has an outer axially extending surface forming the circumferentially extending contact surface of the first connector element, on which the contact members of the first connector element are provided and accessible, and the socket has an axially extending surface being the radially outer boundary of the socket and forming the circumferentially extending contact surface of the second connector element on which the contact members of the second connector element are provided and accessible. The socket and the peg are complementary to each other such that the peg is configured to be received inside the socket, whereby, when the peg is received inside the socket, at least one contact member on the circumferentially extending contact surface of the peg and a contact member on the circumferentially extending contact surface of the socket make electric contact with each other. More particular and more commonly, it may be provided that each contact member on the circumferentially extending contact surface of the peg makes electric contact with a contact member on the circumferentially extending contact surface of the socket and vice versa. In particular instances, the first connector element comprising the peg may be attached to a sensor, thus forming an assembly with the sensor, may be part of a sensor head, or may be part of a sensor assembly comprising a sensor and a sensor head, and is configured to transmit data originating from the sensor to the second connector member comprising the socket. The sensor head may comprise electronics for processing data from the sensor, and may comprise, for one specific instance, an analog-digital converter. In this specific instance, matching contact members of one group of contact members may transmit digitized signals originating from the sensor to the second connector member comprising a socket and matching contact members of the second group of contact members may transmit power form the connector member comprising a socket to the first connector member comprising a peg. The sensor may for instance be a sensor for pH measurements, a conductivity sensor, an ion-selective electrode to measure ion concentrations, a sensor to determine dissolved oxygen, turbidity and/or oxidation reduction potential. As the peg is easier to clean than the socket and as the sensor is typically more exposed and therefore more likely to be soiled, it is preferably the connector element comprising the peg which is mounted to the sensor.

It may further be the case that, in a system as mentioned above, a coding key is provided on the circumferentially extending contact surface of one of the peg and the socket and an axially extending slot is provided on the circumferentially extending contact surface of the other one of the peg and the socket. The axially extending slot is configured to receive the coding key when the peg is received within the socket, wherein the coding key and the axially extending coding slot are arranged and configured such that the peg can only be received within the socket in one relative circumferential orientation, in particular about their axial centrelines. It is found beneficial if the two connector members can only be matched in this one relative position, because wrong connection of contact members of the two connector elements is prevented.

In another aspect, disclosed is a signal transmission device comprising a connector element in which the contact members comprise a soldering lug projecting from the back face of the contact member carrier and a signal cable having at least four wires. At least one wire is connected to each of the soldering lugs, and a sealing sleeve is placed over the cable in a sealing relationship and covering the back side of the contact member carrier and the soldering lugs and is configured to provide at least liquid-proof sealing of the inner space including the soldering lugs.

Still further disclosed is a method for assembling an electronic device according to any of the type outlined above. The method comprises providing a connector element having a peg extending from a cylindrical section having a larger cross-sectional dimension than the peg, wherein the cylindrical section comprises at least one circumferential groove on its outer diameter, wherein the circumferential groove is configured to receive an O-ring therein; providing a printed circuit board and placing a first end of the printed circuit board in the clear space between the projecting sections of the first group of contact members and the projecting sections of the second group of contact members, providing a housing comprising a cylindrical inner diameter dimensioned to achieve sealing with the O-ring provided on the connector element, directly soldering the projecting sections of the first group of contact members to respective conductor paths provided on a first side at the first end of the printed circuit board and directly soldering the projecting sections of the second group of contact members to respective conductor paths provided on a second side at a first end of the printed circuit board, connecting one of a pluggable connector or a sensor to a second end of the printed circuit board opposite the first end of the printed circuit board, said one of the pluggable connector or sensor comprising a radially extending structure configured as an end stop for the housing, and axially displacing the housing over the connector element towards one of the pluggable connector or sensor until the housing engages the end stop.

It is understood that the features and embodiments disclosed above may be combined with each other. It will further be appreciated that further embodiments are conceivable within the scope of the present disclosure and the claimed subject matter which are obvious and apparent to the skilled person by virtue of the present disclosure.

BRIEF DESCRIPTION OF THE DRAWINGS

The subject matter of the present disclosure is now to be explained in more detail by means of selected exemplary embodiments shown in the accompanying drawings. It is understood that the drawings are highly schematic, and details not required for instruction purposes may have been omitted for the ease of understanding and depiction. It is further understood that the drawings show only selected, illustrative embodiments, and embodiments not shown may still be well within the scope of the herein disclosed and/or claimed subject matter.

The figures show.

DETAILED DESCRIPTION OF EXEMPLARY EMBODIMENT(S)

Figure 1:
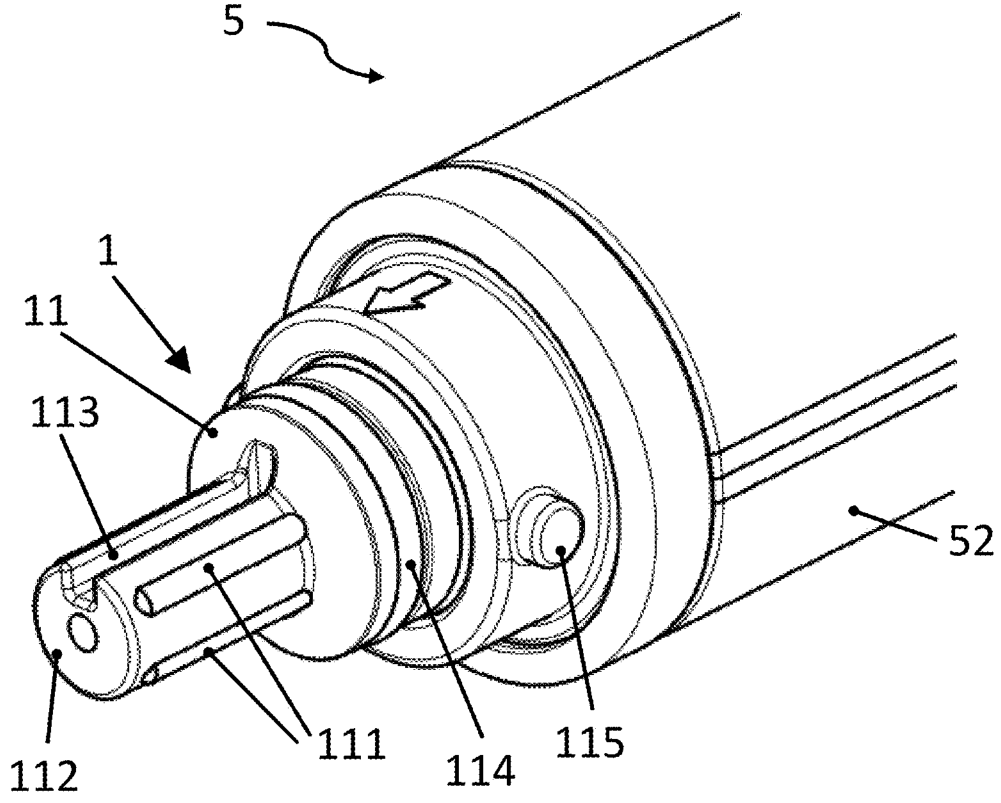
FIG. 1 a partial view of an electronic device comprising a connector element according to one exemplary embodiment of the herein disclosed subject matter.

FIG. 1 shows an exemplary embodiment of a connector element 1 of the herein disclosed type which is attached, for instance, as a terminal to an electronic device 5, such as for instance a sensor head. Sensor head 5 may in particular include electronic devices for processing measurement data received from a sensor. For instance, a sensor head may include an analog-digital converter to convert analog measurement signal received from a sensor into a digital representation of the measurement signal for being further processed and/or stored in digital devices. Sensor head 5 comprises a housing 52 which in turn comprises locking pin 115. Connector element 1 is partly received within housing 52 and projects from housing 52 with a front section thereof. Essentially, connector element 1 comprises contact members 111 intended for making electric contact with counterpart contact members provided in a counterpart contact element to contact element 1, and contact member carrier 11. Contact member carrier 11 comprises peg 112 axially projecting at a front end of contact member carrier 11. A circumferentially extending and essentially cylindrical surface is provided on the lateral surface of peg 112. Contact members 111 extend in an axial direction on the circumferentially extending contact surface of contact member carrier 11, which circumferentially extending contact surface is in turn provided on peg 112. It is noted that, as peg 112 forms an integral part of contact member carrier 11, each feature or element of peg 112 is also a feature of contact member carrier 11, and hence the circumferentially extending contact surface of peg 112 is also a circumferentially extending contact surface of contact member carrier 11. Contact members 111, as will be outlined below, are partly received within contact member carrier with a part of their cross sections received within peg 112, while a free contact surface is accessible on the circumferentially extending contact surface of the contact member carrier, which is provided along peg 112. Contact member carrier 11, or peg 112, respectively, are provided with axially extending slot 113, which is configured to interact with a counterpart element provided inside a counterpart connector element to connector element 1, such that connector element 1 can only be matched with a counterpart connector element in one circumferential orientation of the two connector members relative to each other. This is explained in more detail below.

Further, an O-ring 114 is received in a circumferential notch of a further cylindrical section of contact member carrier 11, wherein the diameter of the further cylindrical section is larger than the diameter of peg 112. The purpose and use of O-ring 114 is outlined in more detail below.

The arrangement of contact members on the circumferential surface of a peg yields various advantages, which include easy cleaning of the contact members, while other beneficial effects may be apparent by virtue of the present description or may otherwise be conceived by the skilled person.

Figure 2:
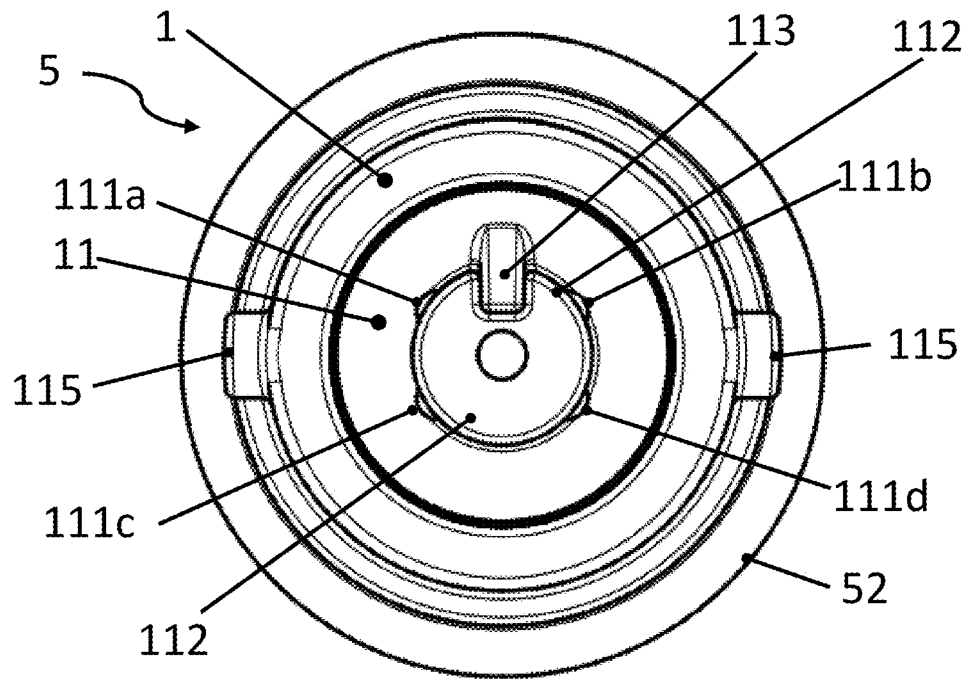
FIG. 2 the electronic device of FIG. 1 in a plan view on a front side.

FIG. 2 shows a plain front view onto the embodiment of FIG. 1 illustrating the arrangement of contact members 111*a*, 111*b*, 111*c* and 111*d*. As can be nicely seen, these contact members are arranged essentially on the corners of the rectangle. The rectangle is non-equilateral, and consequently the contact members are unevenly and non-equidistantly distributed in the circumferential direction around peg 112. That is, the insulation distance from any contact member to their neighboring contact members is different for each neighboring contact member. The insulation distance between two contact members is measured as a minimum clearance between the outer boundaries of two contact members.

Contact member 111*a*, for an instance, has a smallest insulation distance with contact member 111 *c*, while it has a larger insulation distance with contact member 111*b* and still a larger insulation distance with contact member 111*d*. Contact member 111*b* has a smallest insulation distance with contact member 111*d*, while it has a larger insulation distance with contact member 111*a* and still a larger insulation distance with contact member 111*c*. Contact member 111*c* has a smallest insulation distance with contact member 111 *a*, while it has a larger insulation distance with contact member 111*d* and still a larger insulation distance with contact member 111*b*. Contact member 111*d* has a smallest insulation distance with contact member 111 *b*, while it has a larger insulation distance with contact member 111*c* and still a larger insulation distance with contact member 111*a*.

Further, the contact members may be grouped into two groups of contact members. For instance, any two contact members located on the edge of one longer side of the rectangle may be considered one pair or group of contact members. That is, contact members 111*a* and contact member 111*b* form one pair or group of contact members, while contact members 111*c* and 111*d* form another pair or group of contact members.

It can then be said that each contact member has its smallest insulation distance with a contact member of the other group of contact members. This smallest insulation distance, i.e., the smallest one of the insulation distances of a given contact member to all other contact members, is referred to as the insulation radius of said contact member or "minimum insulation distance". The insulation distance between two contact members is measured as the minimum clearance between the outer boundaries of two contact members. The insulation radius of a given contact member is measured as the minimum clearance between the outer boundaries of said contact member and its closest neighbouring contact member.

The specific arrangement of the contact members yield the effect that signals transmitted through contact member 111*a* are less sensitive to interferences from contact member 111*b* than to interferences from contact member 111*c*, signals transmitted through contact member 111*b* are less sensitive to interferences from contact member 111*a* than to interferences from contact member 111*d*, signals transmitted through contact member 111*c* are less sensitive to interferences from contact member 111*d* than to interferences from contact member 111*a* and signals transmitted through contact member 111*d* are less sensitive to interferences from contact member 111*c* than to interferences from contact member 111*b*.

Figure 3:
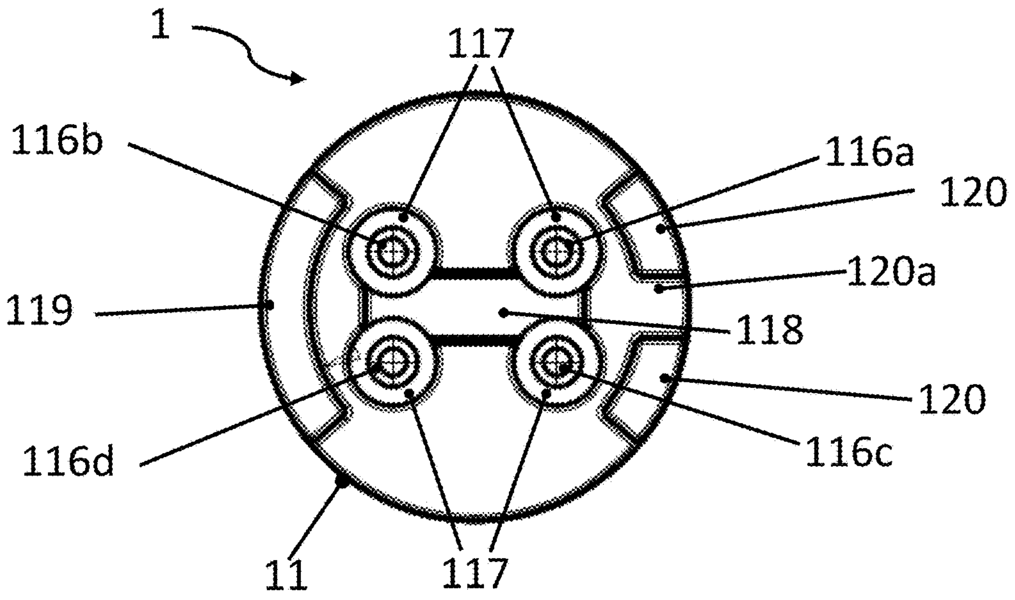
FIG. 3 a plan view onto the back side of the contact member carrier of the connector element shown in FIG. 1.

FIG. 3 shows an exemplary connector element 1 from FIGS. 1 and 2 in a plan view onto the back side. The contact members extend axially through contact member carrier 11 and project on the back side of contact member carrier 11 with projecting sections 116*a*, 116*b*, 116*c* and 116*d* of the contact members, which fact will be better appreciated by virtue of FIGS. 4 and 5. The contact member projecting sections are also arranged essentially on the corners of an non-unilateral rectangle, wherein the projecting sections 116*a* and 116*b* of the first group of contact members 111*a* and 111*b*, as well as projecting sections 116*c* and 116*d* of the second group of contact members 111*c* and 111*d*, each have a common tangent facing the projecting sections of the respective other group of contact members. A free space is provided between the projecting sections of the two groups of contact members, or between said tangents, and is dimensioned and configured for receiving a printed circuit board between the projecting sections of the two groups of contact members. A recess 118 is provided in the back side of contact member carrier 11, adjacent the clear space and between the projecting sections of the contact members. The recess is intended to receive projections of the printed circuit board projecting beyond its nominal dimensions, while still receiving the printed circuit board flush between the projecting sections of the contact members. Thus, by virtue of recess 118, larger manufacturing tolerances of the dimensions of the printed circuit board are acceptable.

Annular recesses 117 are formed on the back side of contact member carrier 11 around the projecting sections of the contact members. These annular recesses 117 serve to increase the distance between the projecting sections of the contact members when measured along the surface of contact member carrier 11, thus decreasing creeping currents between the individual projecting sections along the contact member carrier.

Further, for the purpose of attaching connecting member 1 to a printed circuit board, or vice versa, contact member carrier 11 comprises on its backside alignment structures 119 and 120. While alignment structure 119 is continuous, support notch 120*a* is provided within alignment structure 120. Support notch 120*a* extends radially through alignment structure 120, essentially subdividing alignment structure 120. The width of support notch 120*a* is dimensioned such that the printed circuit board can be received within support notch 120*a*. Support notch 120*a* is further located on a radial extension of the clear space between the projecting sections 116*a* and 116*b* of the first group of contact members and the projecting sections 116*c* and 116*d* of the second group of contact members. A printed circuit board may thus be received in the clear space between the projecting sections and inside support notch 120*a*, and be supported in a circumferential direction and against falling over by the adjacent sections of alignment structure 120 and by the projecting sections of the contact members, and is further radially aligned by alignment structure 119.

Figure 4:
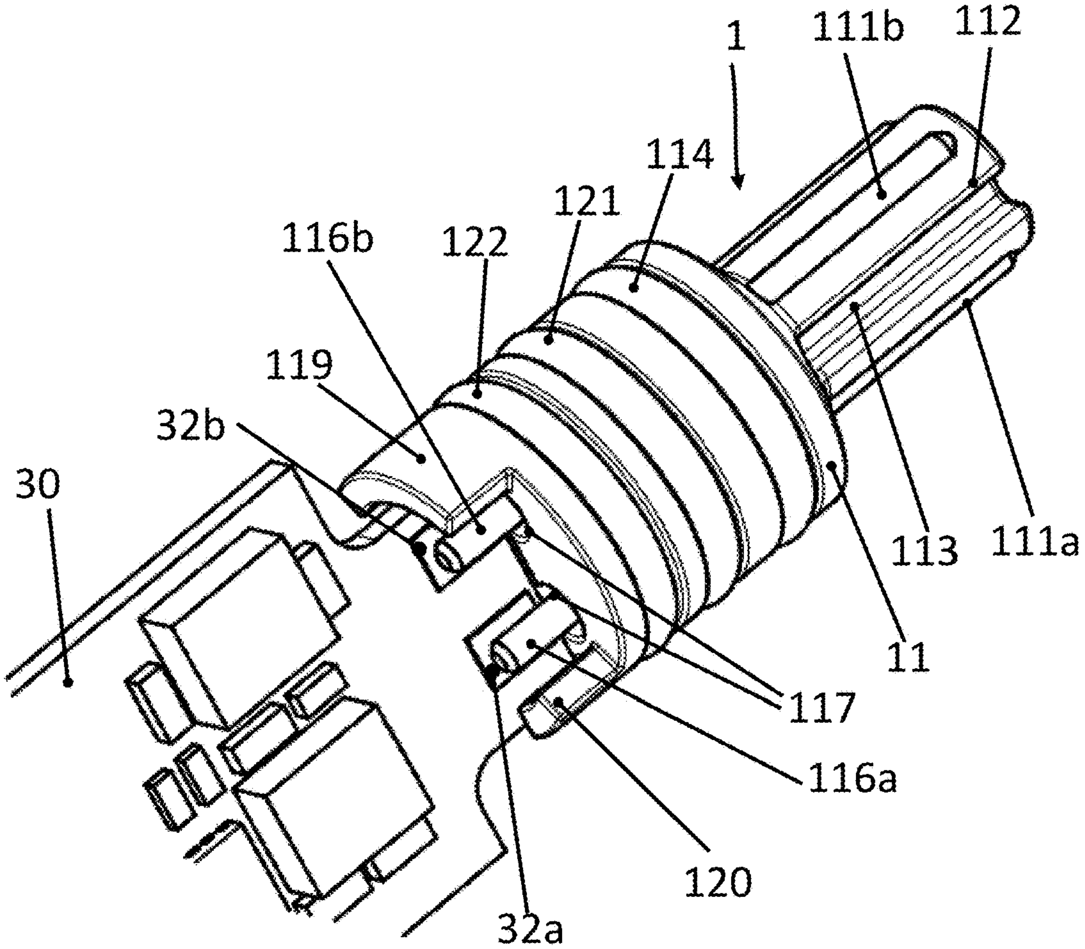
FIG. 4 a perspective view of the electronic device of FIG. 1 with the housing removed.

FIG. 4 shows an electronic device wherein a printed circuit board 30 comprising various circuit elements (without reference numerals) is received by connector element 1 and connector element 1 is connected to printed circuit board 30. Printed circuit board 30 is received between the projecting sections 116*a* and 116*b* of the first group of contact members and the projecting sections 116*c* and 116*d* of the second group of contact members, wherein the latter ones are not visible in the current depiction, and are further received within the support notch provided in alignment structure 120. The clear space between the projecting sections 116*a* and 116*b* of the first group of contact members and the projecting sections 116*c* and 116*d* of the second group of contact members is dimensioned such that printed circuit board 30 is received with comparatively little play, or in a fit. As outlined above, the clear space between the projecting sections 116*a* and 116*b* of the first group of contact members and the projecting sections 116*c* and 116*d* of the second group of contact members may for instance measure more than or equal to one times the thickness of the printed circuit board and smaller than or equal to 1.2 times the thickness of the printed circuit board, and may in even more particular embodiments correspond to more than or equal to 1.05 times the thickness of the printed circuit board and smaller than or equal to 1.1 times the thickness of the printed circuit board. Consequently, the projecting sections of the contact members are located close to conductor paths 32*a* and 32*b* on the side of the printed circuit board which is visible in the current depiction, and analogous conductor paths on the currently not visible side of printed circuit board matching projecting sections 116*c* and 116*d*, which are hidden by the printed circuit board. Thus, projecting sections can be soldered directly to the respective contact paths. As can be seen, the printed circuit board is received non-symmetrically with respect to a centerline of the connector member. Due to the printed circuit board being radially supported by alignment structure 119 while being received in the support notch of alignment structure 120, the printed circuit board in the area received by the connector member is laterally shifted with respect to the centerline of the connector element. The projecting sections of the contact members, however, are arranged symmetrically to the centerline of the connector member. Consequently, the conductor paths intended for soldering the projecting sections to are non-symmetrically and laterally offset arranged on the printed circuit board. Hence, the projecting sections of the contact members and the contact paths they are intended to be soldered to can only be matched and brought into congruence with each other in one single orientation and position of printed circuit board 30. It is hence not possible to inadvertently and by mistake connect any of contact members 111*a*, 111*b*, 111*c* and 111*d* through their respective projecting sections 116*a*, 116*b*, 116*c* and 116*d* to a wrong contact path.

Moreover, as can be seen in FIG. 4, on the cylindrical section of contact member carrier 11 which has the larger diameter than peg 112, besides O-ring 114 two further O-Rings 121 and 122 are provided in respective circumferential notches.

Figure 5:
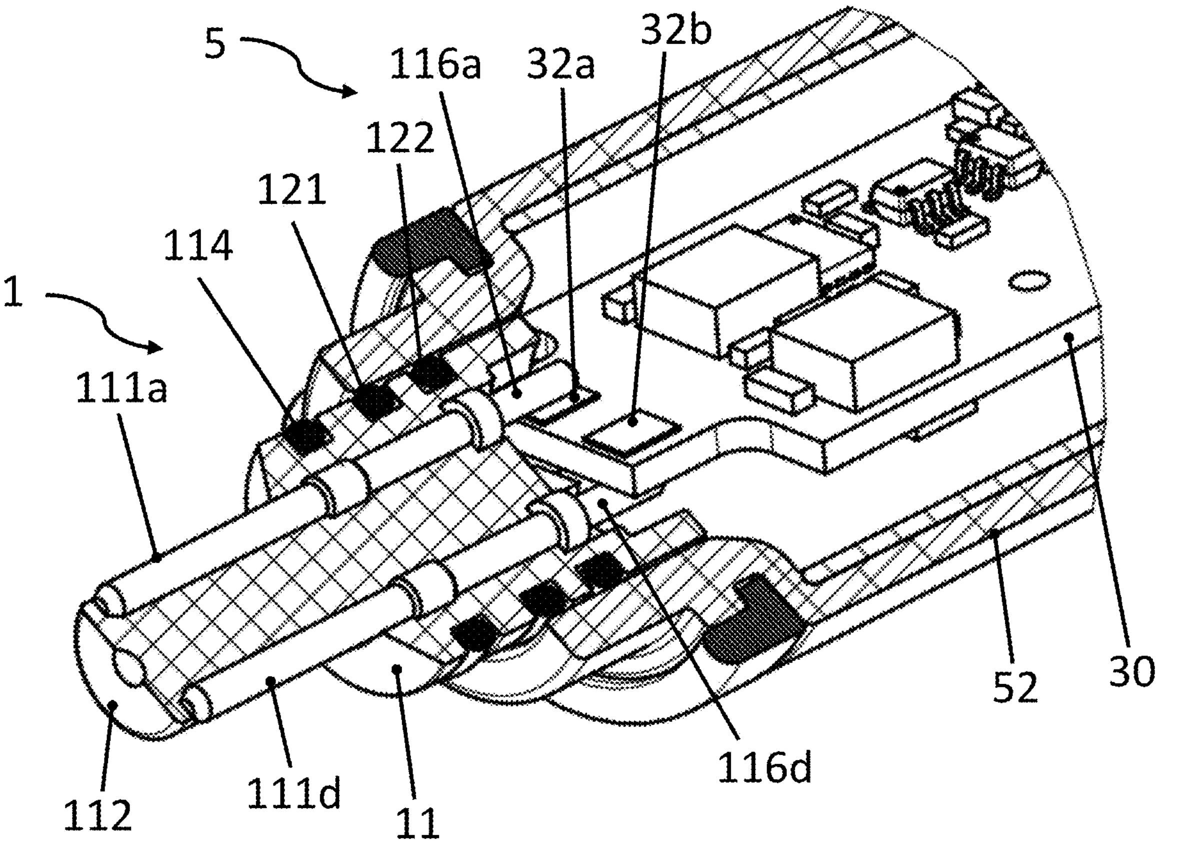
FIG. 5 a sectional view of a part of the electronic device of FIG. 1.

FIG. 5 shows a sectional view through a part of sensor head 5 shown in FIGS. 1 and 2. O-rings 121 and 122 provide sealing between contact member carrier 11, or connector member 1, respectively, and housing 52. The connector members, of which connector members 111*a* and 111*d* are visible, are essentially embedded inside contact member carrier 11, while being exposed with lateral surfaces at the circumferential surface of peg 112, and on the back side of contact member carrier 11 with their respective projecting sections. The contact members comprise collars which affect an axial fixation inside contact member carrier 11, as is shown in FIG. 5 at contact members 111*a* and 111*d*.

It was outlined above, in connection with FIG. 2, that signals transmitted through any of the contact members have different sensitivities to interferences from signals transmitted through different other contact members. Generally, any contact member is, by the different insulation distances, arranged such that signals transmitted therethrough are less sensitive interferences from the contact member in the same group of contact members, wherein, as repeatedly mentioned above, contact members 111*a* and 111*b* form one group of contact members and contact members 111*c* and 111*d* formed another group of contact members. Printed circuit board 30 may thus be configured such that one group of contact members, for instance 111*a* and 111*b*, are intended and connected with the printed circuit board to transmit digital signals, while the other group of contact members, for instance 111*c* and 111*d* are intended and connected to the printed circuit board for the transmission of power. While currents transmitted through the power transmitting contacts may yield higher interferences on the signals transmitted through a neighboring signal transmitting contact, digital signals and interferences from a power transmitting contact may be easily divided from each other for instance by AC coupling or high-pass filtering of the signals transmitted through the signal transmitting contact. The signal transmitting contacts, however, have a larger insulation distance and hence larger insulation resistance to each other. In other words, the distance between the contact is chosen relatively large where needed and relatively small where possible. Thus, detrimental signal interferences at the contact member are largely reduced, compared to an equidistant arrangement of the contact members, while the connector element still is compact, in that no diameter increase of the surface on which the contact members are arranged is required.

Figure 6:
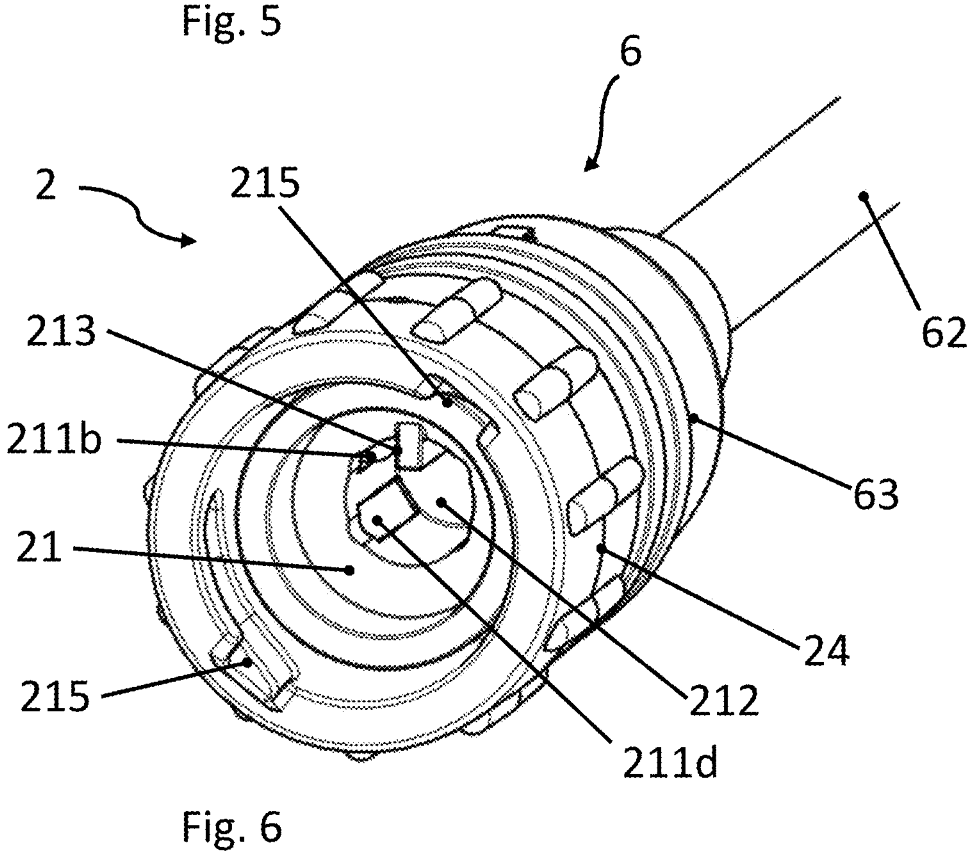
FIG. 6 a transmission cable with a second exemplary embodiment of the herein described connector element connected thereto.

FIG. 6 outlines a part of a signal transmission device 6 comprising a different embodiment of connector element 2 and a transmission cable 62. Connector member 2 comprises contact member carrier 21 and contact members, of which only contact members 211*b* and 211*d* are visible in the present depiction. It is understood that contact member 211*b* is intended for making contact with contact member 111*b* of previously discussed connector element 1 and contact member 211*d* is intended for making contact with contact member 111*d* of previously discussed connector element 1 when connector elements 1 and 2 are matched with and connected to each other. The contact members of connector element 2 are located on and accessible at a circumferentially extending contact surface of contact member carrier 21, which in turn is formed as the outer wall of socket 212. Connector element 2 further comprises looking sleeve 24, which is revolvably and axially mobile attached to contact member carrier. However, locking sleeve 24 is axially trapped between axial end stops, as will become apparent below. Generally L-shaped bayonet lock grooves 215 are provided on the inner surface of looking sleeve 24 and open at the front side. Those are intended to receive and lock with locking pins 115 provided on the housing of previously discussed sensor head 5. Key 213 extends from the circumferentially extending contact surface delimiting socket 212 and extends into socket 212. Key 213 is dimensioned and configured to fit into slot 113 of connector element 1 discussed in FIGS. 1 through 5 above. Key 213 and slot 113 serve as coding structures and ensure that connector elements 1 and 2 can only be matched and plugged together in one single relative position relative to each other, about their longitudinal axis. It can be said that slot 113 and key 213 break the symmetry of the connector elements and define a reference position or marked position of a connector element in the circumferential direction. It is thus ensured that each contact member in connector element 1 makes contact with right counterpart contact member in connector element 2. Wrong connection is virtually impossible. Key 213 and slot 113 may thus be referred to as coding structures. Key 213 may be referred to as a coding protrusion or positive coding feature or positive coding structure or projecting coding structure, while slot 113 may be referred to as coding slot, coding notch, coding groove, or the like, or as negative or recessed coding feature or negative or recessed coding structure. A sealing sleeve 63 is mounted over the cable in a sealing relationship and covers and seals the back side of the contact member carrier and electric connections provided there, as will be better appreciated below.

Figure 7:
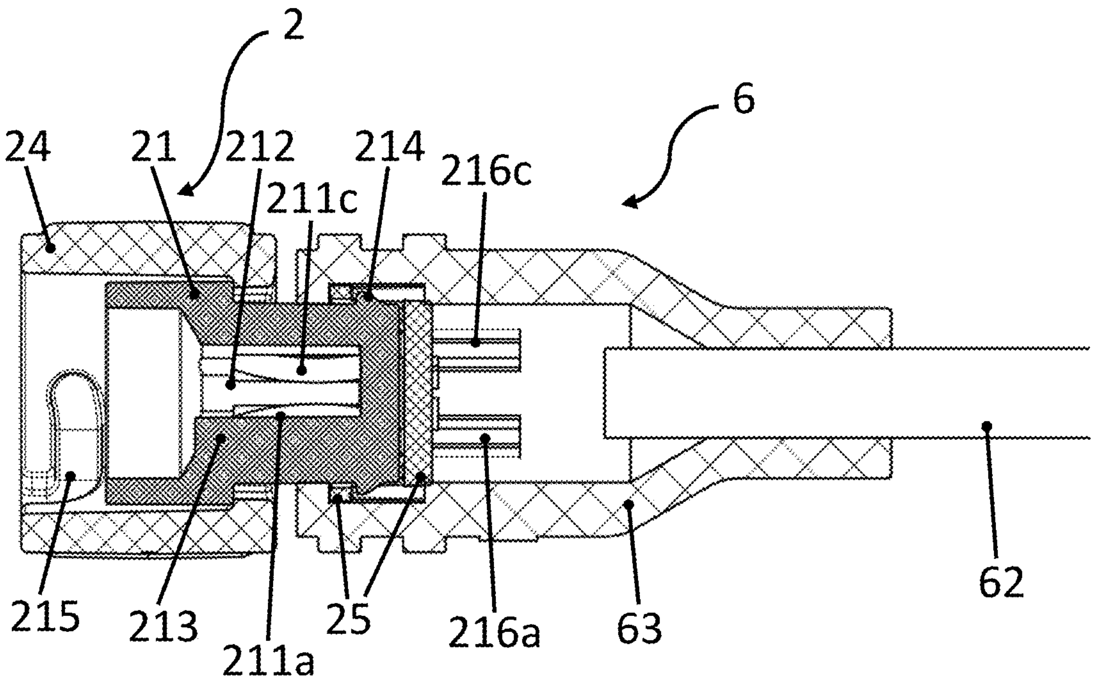
FIG. 7 a sectional view of the connector element and the transmission cable of FIG. 6.
Figure 8:
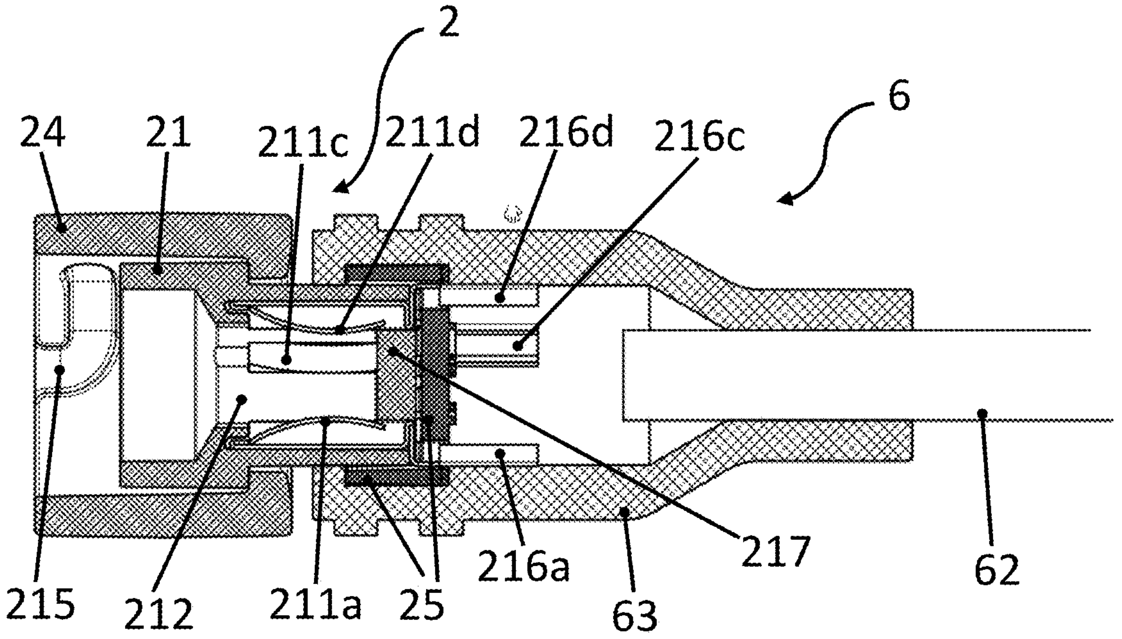
FIG. 8 a sectional view of the connector element and the transmission cable of FIG. 6 in a different circumferential position.

FIGS. 7 and 8 show longitudinal sections of device 6 shown in FIG. 5. Contact members 211*a*, 211*b*, 211*c* and 211*d*, of which only contact members 211*a* and 211*c* are visible in the depiction of FIG. 7, are inserted into contact member carrier 21, accessible from inside socket 212, and held in place by contact holder 25. Contact member carrier 21 comprises retainment hooks 214 to which contact holder 25 is secured on the back side of contact member carrier 21, holding the contact members in place in contact member carrier 21. As will be appreciated when considering FIG. 7 in connection with FIG. 8, in particular when considering contact members 211*a* and 211*d* in FIG. 8, the contact members are inserted into matching slots of contact member carrier 21 at a front end of the contact members, and the radially inner spring sections of the contact members are further supported by a ledge 217 of the contact member carrier. On a back end, the contact members are equipped with soldering lugs, of which only soldering lugs 216*a* and 216*c* are visible in FIG. 7, and soldering lugs 216*a*, 216*c* and 216*d* are visible in FIG. 8. The soldering lugs extend through openings in contact holder 25 and project from the backside of contact member carrier 21. Further, in FIG. 7, coding key 213 can be seen, projecting into socket 212. It may further be provided that contact designations are imprinted on otherwise marked on the back side of contact holder 25, and further matching coding structures may be provided on the back side of contact member carrier 21 and on contact holder 25, so that contact holder 25 can be attached and locked to contact member carrier 21 in one position only. The marks on the back side of contact holder 25 then provide an allocation of the soldering lugs to contact members having a specific position relative to coding key 213, which is visible on the back side. Individual wires from cable 62 and then is soldered to the soldering lugs. Cable 62 may include four or at least four wires. Sealing sleeve 63 is pushed over cable 62 and can be put over contact holder 25 and the backside of contact member carrier 21 after the wires have been connected to the soldering lugs of the contact member, so to achieve, in embodiments, a liquid tight sealing between cable 62 and connector element 2. Looking sleeve 24 is provided on the front side of connector element 2. Looking sleeve 24, at its back end, comprises an inward pointing abutment collar which is axially trapped between an abutment shoulder of contact member carrier 21 and a front end of sealing sleeve 63. Looking sleeve 24 is thus held relative to contact member carrier 21 revolvably and with restricted axial mobility between the abutment shoulder of contact member carrier 21 and the front end of sealing sleeve 63. Further, one bayonet locking groove 215 is visible in the depiction of FIGS. 7 and 8.

Figure 9:
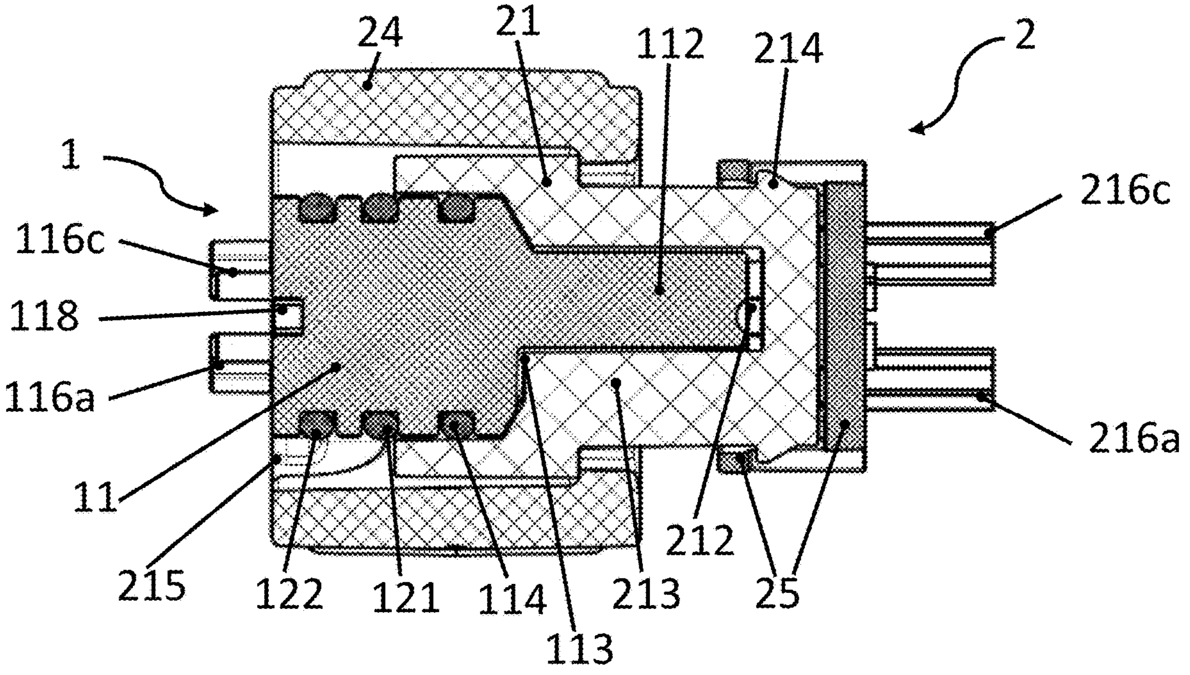
FIG. 9 a connector system in which the contact member carrier of one embodiment of a connector element is received within a connector element according to a second embodiment.

FIG. 9 illustrates essentially how a connector element of the type outlined in FIGS. 1 through 5 is matched with and connected to a connector element of the type outlined in connection with FIGS. 6 through 8. Illustration of housing 52 has been omitted. Peg 112 of contact member carrier 11 is received within socket 212 of contact member carrier 21 with coding key 213 being received within coding slot 113. O-ring 114 provided on a cylindrical surface of contact member carrier 11 having a larger diameter than peg 112 effects sealing with an inner surface of contact member carrier 21 of connector element 2. O-rings 121 and 122 seal with housing 52 which is not shown in the present depiction. The fact, however, is clear to a person having skill in the art by virtue of the description above. Bayonet locking groove 215 interlocks with locking pin 115 on the housing. Again, the fact is clear to a person having skill in the art by virtue of the description above, although housing 52 and the locking pin 115 have been omitted in FIG. 9. By the interlocking of bayonet locking groove 215 and locking pin 115, the connection between the two connector elements is mechanically secured.

Figure 10:
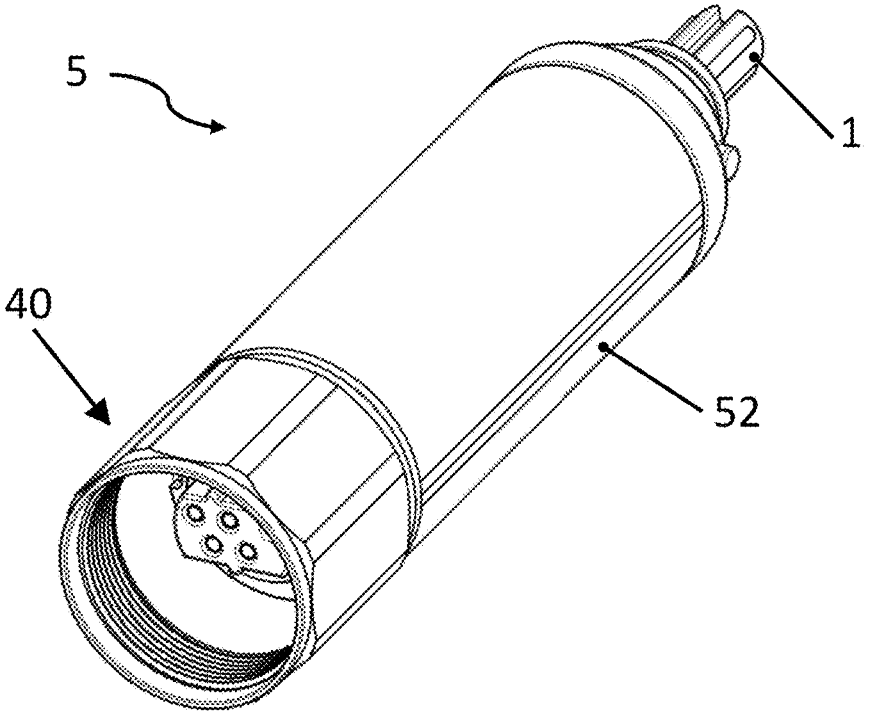
FIG. 10 an electronic device according comprising a connector element according to an embodiment of the herein disclosed subject matter and a further pluggable connector.

FIG. 10 illustrates an embodiment of an electronic device 5, which may in particular be a sensor head, which comprises a connector element 1 of the type herein described. Essentially, sensor head 5 comprises a pluggable connector 40, a housing 52 containing electronics, and connector element 1. In particular instances, electronic device 5 may be the electronic device discussed in connection with FIGS. 1, 2, 4 and 5 above, in which a printed circuit board which connector element 1 connected to an end of the printed circuit board is provided. Pluggable connector 40 is connected to the other end of the printed circuit board in any suitable manner which, while not explicitly illustrated, is known to the person having skill in the art or in any other manner herein described or developed later. For one specific instance, electronic device 5 may be an analog-digital converter, with the analog-digital converter electronics provided on printed circuit board 30 illustrated in FIGS. 4 and 5 and contained inside housing 52. Analog signals from a sensor may be provided to pluggable connector 40 and be transmitted to the printed circuit board from there. The electronics on printed circuit board 30 convert the analog measurement signals into digital representation thereof and forward the digital signals to connector element 1. In a manner outlined above, connector 1 may be connected to a transmission device 6 as shown in FIGS. 6 through 8 via connector 2 shown in the mentioned figures as a part of a transmission device. The transmission device may forward the digital signals to an electronic device for further processing and/or storing the digitized data.

It shall be noted that it may also be possible that a connector element comprising the socket may be provided with contact members extending through the contact member carrier and projecting from the back side of the contact member carrier with projecting sections, thus being configured to be directly connected to the printed circuit board. Likewise, the connector element having the peg may be provided with contact members having soldering lugs and may be configured to be connected to the cable of the transmission device.

While the subject matter of the disclosure has been explained by means of exemplary embodiments, it is understood that these are in no way intended to limit the scope of the claimed invention. It will be appreciated that the claims cover embodiments not explicitly shown or disclosed herein, and embodiments deviating from those disclosed in the exemplary modes of carrying out the teaching of the present disclosure will still be covered by the claims.

Reference signs list

| | |
|---|---|
| 1 | connector element |
| 2 | connector element |
| 5 | electronic device, sensor head |
| 11 | contact member carrier |
| 21 | contact member carrier |
| 24 | locking sleeve |
| 25 | contact holder |
| 30 | printed circuit board |
| 32a, 32b | conductor path |
| 52 | housing |
| 62 | transmission cable |
| 63 | sealing sleeve |
| 111, 111a, 111b, 111c, 111d | contact member |
| 112 | peg |
| 113 | slot; coding structure |
| 114 | O-ring |
| 115 | locking pin |
| 116a, 116b, 116c, 116d | projecting section of a contact member |
| 117 | annular recess |
| 118 | recess |
| 119 | alignment structure |
| 120 | alignment structure |
| 120a | support notch |
| 121 | O-ring |
| 122 | O-ring |
| 211a, 211b, 211c, 211d | contact member |
| 212 | socket |
| 213 | key, coding structure |
| 214 | retainment hook |
| 215 | bayonet locking groove |
| 216a, 216b, 216c, 216d | soldering lug |
| 217 | ledge |

What is claimed is:

1. A connector element for a connector system, said connector element comprising:

four contact members for making electric contact on a front side of the connector element; and a contact member carrier, wherein the contact member carrier comprises a circumferentially extending contact surface having an axial extent;

wherein the contact members extend in an axial direction on the circumferentially extending contact surface of the contact member carrier;

wherein, on the circumferentially extending contact surface of the contact member carrier, the contact members have a free contact surface which is accessible on the circumferentially extending contact surface of the contact member carrier;

wherein each of the contact members has an insulation radius, the insulation radius being, when measured in a view onto the front face, a minimum clearance between outer boundaries of a respective one of said contact members and a closest neighbouring one of the contact members to the respective one of said contact members;

wherein the contact members are grouped into two groups such that, for each of the contact members, the closest neighbouring one of the contact members, which defines the respective contact member's insulation radius, belongs to a different one of the two groups of the contact members from the respective one of the contact members.

2. The connector element of claim 1, wherein:

the contact members are arranged on corners of a tetragon;

the tetragon has at least two parallel sides; and the parallel sides of the tetragon extend at least between the contact members of each of the two groups of contact members.

3. The connector element of claim 1, wherein:

the contact members extend axially through the contact member carrier and project on a back side of the contact member carrier with projecting sections of the contact members;

the projecting sections of each of the two groups of contact members have common tangents; and the common tangent of the projecting sections of a first one of the two groups of contact members on a side facing the projecting sections of a second of the two groups of contact members is parallel to the common tangent of the projecting sections of the second group of contact members facing the projecting sections of the first one of the two groups of contact members, whereby a clear space is provided between the projecting sections of the first group of contact members and the projecting sections of the second group of contact members.

4. The connector element of claim 3, wherein:

on its back side, the connector element comprises at least one alignment structure, configured and adapted for receiving and aligning a printed circuit board;

the at least one alignment structure comprises at least one axially extending support notch formed in the at least one alignment structure, the at least one support notch configured to receive a printed circuit board when the printed circuit board is advanced into the support notch along the axial direction of the connector element while two faces of the printed circuit board extend in an axial direction of the connector element and in a radial direction of the connector element;

the at least one support notch extends in an axially extending plane between the two groups of contact members; and a first one of the at least one support notch extends radially to a greater extent than a further support notch on the radially opposite side of the connector element.

5. The connector element of claim 4 wherein:

the first one of the at least one support notch extends radially entirely through one of the at least one alignment structure and an alignment structure wall on a radially opposite side of the connector element is closed on a radially outer side.

6. The connector element of claim 1, wherein:

the contact members extend axially through the contact member carrier and project on a back side of the contact member carrier with projecting soldering lugs.

7. The connector element of claim 1, wherein:

the circumferentially extending contact surface of the contact member carrier is cylindrical.

8. The connector element of claim 1, wherein:

the contact member carrier comprises a peg; and the circumferentially extending contact surface of the contact member carrier is provided on the lateral surface of the peg.

9. The connector element of claim 8, wherein:

the peg extends from a cylindrical section of the connector element having a larger cross-sectional dimension than the peg;

the cylindrical section comprises at least one circumferential groove on its outer diameter; and the circumferential groove is configured to receive an O-ring therein.

10. The connector element of claim 1, wherein:

the contact member carrier comprises a socket, the socket having an axially extending wall limiting the socket and forming the circumferentially extending contact surface.

11. The connector element of claim 1, wherein:

a locking sleeve is revolvably and axially mobile received on the connector element.

12. An electronic device comprising:

the connector element of claim 3; and a printed circuit board, wherein the printed circuit board is received in the clear space between the projecting sections of the first group of contact members and the projecting sections of the second group of contact members and the projecting sections of the contact members are soldered directly to conductor paths of the printed circuit board.

13. The electronic device of claim 12, wherein:

a housing is provided which encases the printed circuit board and at least a part of the connector element; and an O-ring sealing is provided between the connector element and the housing.

14. A system comprising:

the connector element of claim 1 as a first connector element; and a second one of the connector element as a second connector element;

wherein the contact member carrier of the first connector element comprises a peg;

wherein the circumferentially extending contact surface of the contact member carrier of the first connector element is provided on the lateral surface of the peg;

wherein the contact member carrier of the second connector element comprises a socket, the socket having an axially extending wall limiting the socket and forming the circumferentially extending contact surface:

wherein the peg of the first connector element has an outer axially extending surface forming the circumferentially extending contact surface of the first connector element and the socket of the second connector element has an axially extending surface forming the circumferentially extending contact surface of the second connector element;

wherein the socket and the peg are complementary to each other such that the peg is receivable inside the socket, whereby, when the peg is received inside the socket, at least one of the contact members on the circumferentially extending contact surface of the peg and one of the contact members on the circumferentially extending contact surface of the socket make electric contact with each other.

15. A signal transmission device comprising:

the connector element of claim 6; and a signal cable having at least four wires, wherein at least one wire is connected to each of the soldering lugs, and a sealing sleeve is placed over the cable in a sealing relationship and covering the back side of the contact member carrier and the soldering lugs and is configured to provide at least liquid-proof sealing of the inner space including the soldering lugs.

16. A method for assembling the electronic device of claim 12, the method comprising:

providing the connector element;

mounting an O-ring into the at least one circumferential groove on a cylindrical section of the connector element;

providing a printed circuit board and placing a first end of the printed circuit board in the clear space between the projecting sections of the first group of contact members and the projecting sections of the second group of contact members;

providing a housing comprising a cylindrical inner diameter dimensioned to achieve sealing with the O-ring provided on the connector element;

directly soldering the projecting sections of the first group of contact members to respective conductor paths provided on a first side and at the first end of the printed circuit board and directly soldering the projecting sections of the second group of contact members to respective conductor paths provided on a second side at the first end of the printed circuit board; and connecting one of a pluggable connector or a sensor to a second end of the printed circuit board opposite the first end of the printed circuit board, said one of the pluggable connector or sensor comprising a radially extending structure configured as an axial end stop for the housing, and axially displacing the housing over the connector element towards one of the pluggable connector or sensor until the housing engages the end stop.

17. The connector element of claim 1, wherein:

said connector element includes no more and no less than the four contact members.

* * * * *